United States Patent [19]

Williamson

[11] Patent Number: 4,856,372

[45] Date of Patent: Aug. 15, 1989

[54] FOUR WHEEL AXLE DIFFERENTIAL

[75] Inventor: Archie O. Williamson, Edina, Minn.

[73] Assignee: Williamson Patent Holding Company, Edina, Minn.

[21] Appl. No.: 278,657

[22] Filed: Dec. 1, 1988

Related U.S. Application Data

[63] Continuation of Ser. No. 194,466, May 16, 1988

[51] Int. Cl.$^4$ ............................................. F16H 1/38
[52] U.S. Cl. ................................... 74/710; 74/713; 74/665 GB; 180/248
[58] Field of Search ............... 74/710, 713, 799, 710.5, 74/700, 711, 665 GB, 665 T; 180/248, 249, 250

[56] References Cited

U.S. PATENT DOCUMENTS

| | | | |
|---|---|---|---|
| 1,812,819 | 6/1931 | Wollensak | 74/710 X |
| 1,828,073 | 10/1931 | Robinson | 74/710 X |
| 2,126,960 | 8/1938 | Higbee | 74/710 X |
| 2,522,193 | 9/1950 | Randall | 74/715 |
| 2,584,115 | 2/1952 | Dinsmoor | 74/799 |
| 2,727,582 | 12/1955 | Lisenby | 74/710.5 X |
| 3,310,999 | 3/1967 | Griffith | 74/710 |
| 3,590,954 | 7/1971 | Plantan | 184/6 U |
| 3,886,813 | 6/1975 | Baremor | 74/710.5 |
| 4,532,828 | 8/1985 | LaGuardia | 74/681 X |
| 4,574,656 | 3/1986 | McCarthy | 74/710.5 X |
| 4,635,505 | 1/1987 | Williamson | 74/713 |
| 4,700,589 | 10/1987 | Coronel | 74/713 X |

FOREIGN PATENT DOCUMENTS

| | | | |
|---|---|---|---|
| 163114 | 9/1905 | Fed. Rep. of Germany | 74/710 |
| 739935 | 8/1943 | Fed. Rep. of Germany | 74/710.5 |
| 3221606 | 12/1983 | Fed. Rep. of Germany | 180/248 |
| 949972 | 9/1949 | France | 74/799 |

Primary Examiner—Leslie A. Braun
Assistant Examiner—Christopher C. Campbell
Attorney, Agent, or Firm—Merchant, Gould, Smith, Edell, Welter & Schmidt

[57] ABSTRACT

A differential (10) for use with dual wheel assemblies (12) includes pinion gears (34) commonly engaged with opposing pairs of bevel gears (36, 38) but at different drive ratios in order to effect differential drive between the dual wheel assemblies, as well as between the wheels in each assembly, so that all four wheels are positively driven independently.

7 Claims, 3 Drawing Sheets

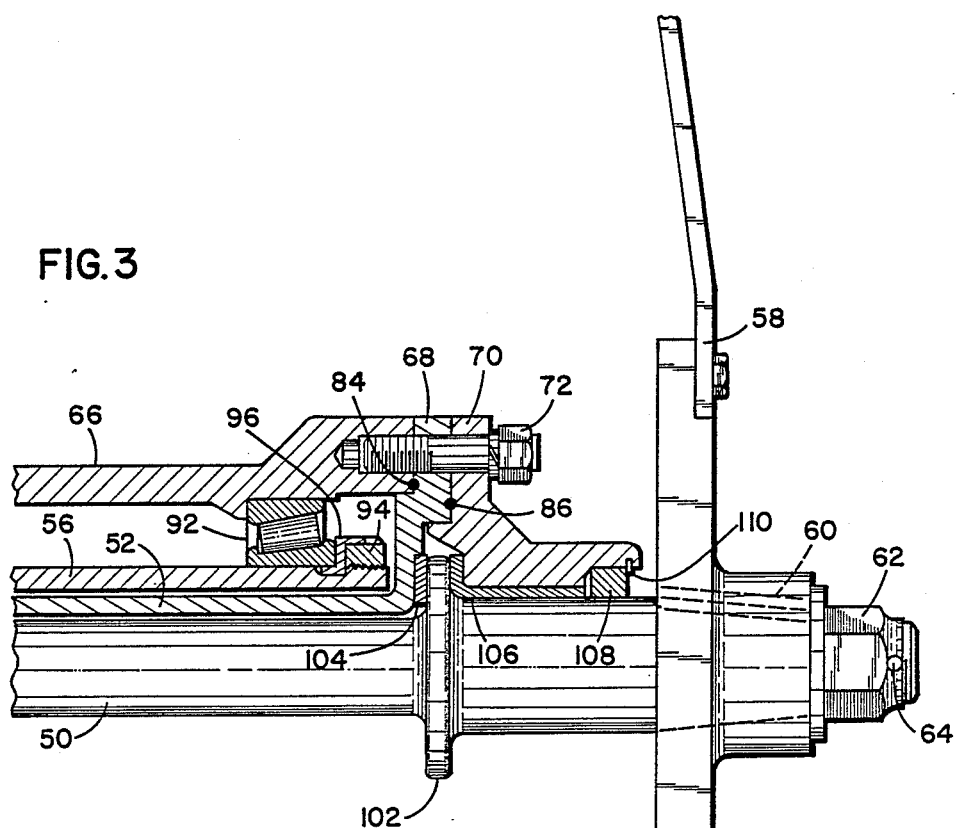
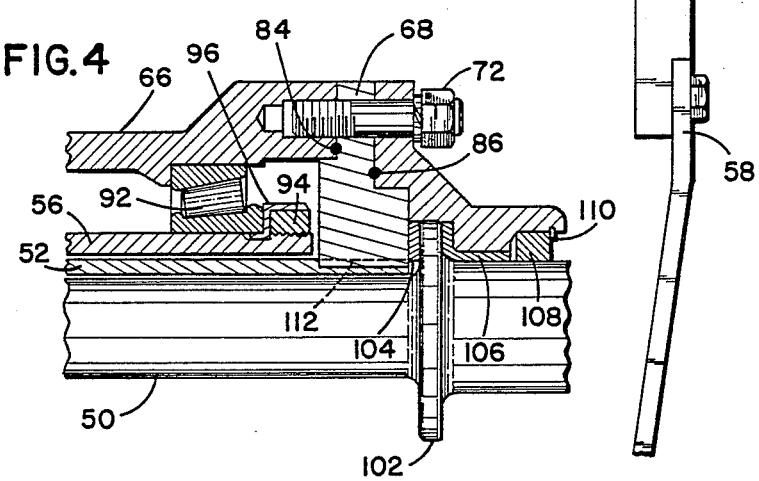

FOUR WHEEL AXLE DIFFERENTIAL

CROSS-REFERENCE TO RELATED APPLICATION

This is a continuation-in-part of expanding application Ser. No. 194,446, filed May 16, 1988.

TECHNICAL FIELD

The present invention relates to power transmissions including differentials. More particularly, this invention concerns an interaxle differential for use with dual wheel assemblies which not only compensates between opposite assemblies, but which also compensates for differential drive between the wheels in each assembly.

BACKGROUND ART

Differentials traditionally have been used for distributing power between the wheels on opposite sides of a vehicle in order to compensate for different relative rates of rotation during maneuvering. The differentials of the prior art typically include a ring gear driven by a pinion gear mounted on the drive shaft. The ring gear is secured to a differential case or housing for rotation therewith. The axles are coupled to coaxial bevel gears which mesh at right angles with pinions mounted on spindles within the differential case. When traveling straight ahead, the differential case simply rotates with the ring gear and there is no relative motion between the pinion and the bevel gears therein. During maneuvering or when rounding a curve, however, one wheel must travel relatively faster and the difference is compensated for by the pinion gears which permit opposite relative rotation of the bevel gears within the differential case so that faster rotation of one axle and wheel is offset by proportionately slower rotation of the other axle and corresponding wheel.

Vehicles, such as trucks and semitractor trailer rigs utilizing tandem axles and dual wheel assemblies, present a more complicated problem. If the axles are arranged in tandem and are both driven, some means must be provided for transferring power between the axles as well as between the dual wheel assemblies on opposite ends of each axle. Various such interaxle differentials have been developed for this purpose. For example, see U.S. Pat. No. 3,590,954 to Plantan. It will be appreciated that the wheels in each wheel assembly of tandem driven axles are usually secured together and driven in common on the same axle. Although the need for compensation is greatest between the dual wheel assemblies on opposite sides of the vehicle, some compensation is also needed between the wheels in each assembly. That is particularly noticeable during tight maneuvering, when tire scuffing and hopping can occur, which in turn decrease control and increase tire wear. The proposed solutions of the prior art in this regard have not been satisfactory. For example, U.S. Pat. No. 2,727,582 to Lisenby shows a differential drive for dual wheel assemblies wherein the inner wheel can be selectively fastened in driving relationship with the outer wheel of the assembly. U.S. Pat. No. 2,126,960 to Higbee shows a complicated independent dual wheel drive which comprises a primary differential and two secondary differentials, one for each of the opposite dual wheel assemblies.

A need has thus arisen for an interaxle differential of improved construction which not only compensates for differential rotation between opposite dual wheel assemblies, but which also compensates for differential driven rotation of the wheels in each assembly.

SUMMARY OF THE INVENTION

The present invention comprises an improved dual wheel differential which overcomes the foregoing and other difficulties associated with the prior art. In accordance with the invention, there is provided a positive differential comprising a housing or case supported for rotation. The case is preferably driven by means of a ring gear, pinion gear, and input shaft, although other suitable drive means can be utilized. The case defines a gear chamber therein containing opposite pairs of pinion gears and concentric side bevel gears. The pinion gears are supported for rotation on a spindle, which itself is rotatable with the case, as are the bevel gears as well. The pinion gears include dual diameter portions, each of which is meshed with one of the two bevel gears on each side. In the preferred embodiment, the inner bevel gear is connected to a solid drive shaft extending to the outer wheel, and the outer bevel gear is connected to a surrounding hollow drive shaft extending to the inner wheel of the associated dual wheel assembly. The drive ratios between the dual diameter pinion gears and the bevel gears is different to provide compensation between the wheels in each assembly, as well as between the dual wheel assemblies, so that all four wheels are positively driven.

BRIEF DESCRIPTION OF THE DRAWING

A better understanding of the invention can be had by reference to the following Detailed Description in conjunction with the accompanying Drawing, wherein:

FIG. 3 is a sectional view showing a modification of the bearing and seal arrangement at one end of the axles; and FIG. 4 is a partial sectional view showing another modification of the dual wheel assembly.

DETAILED DESCRIPTION

Figure 1:
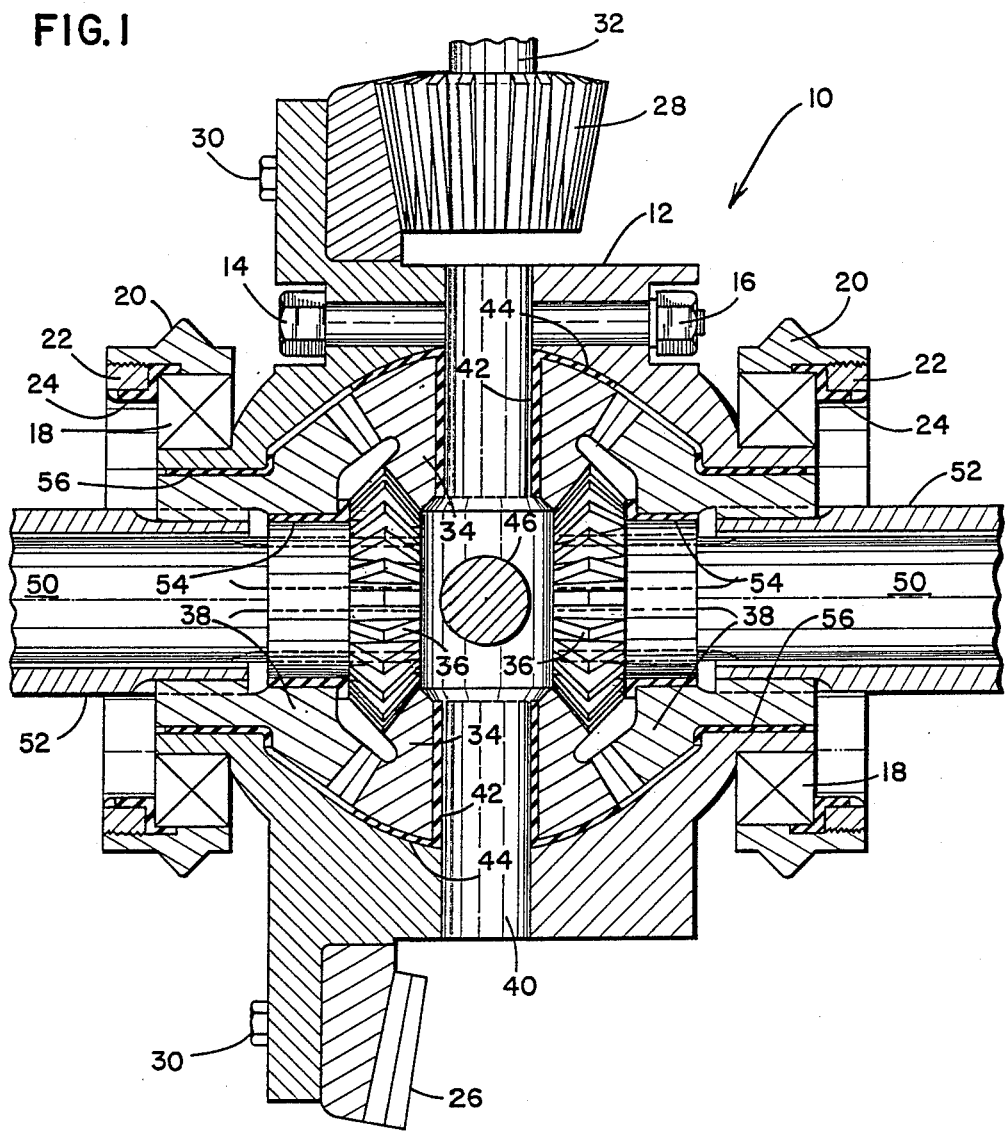
FIG. 1 is a sectional view of the center portion of a transmission with the dual wheel differential incorporating the invention.
Figure 2:
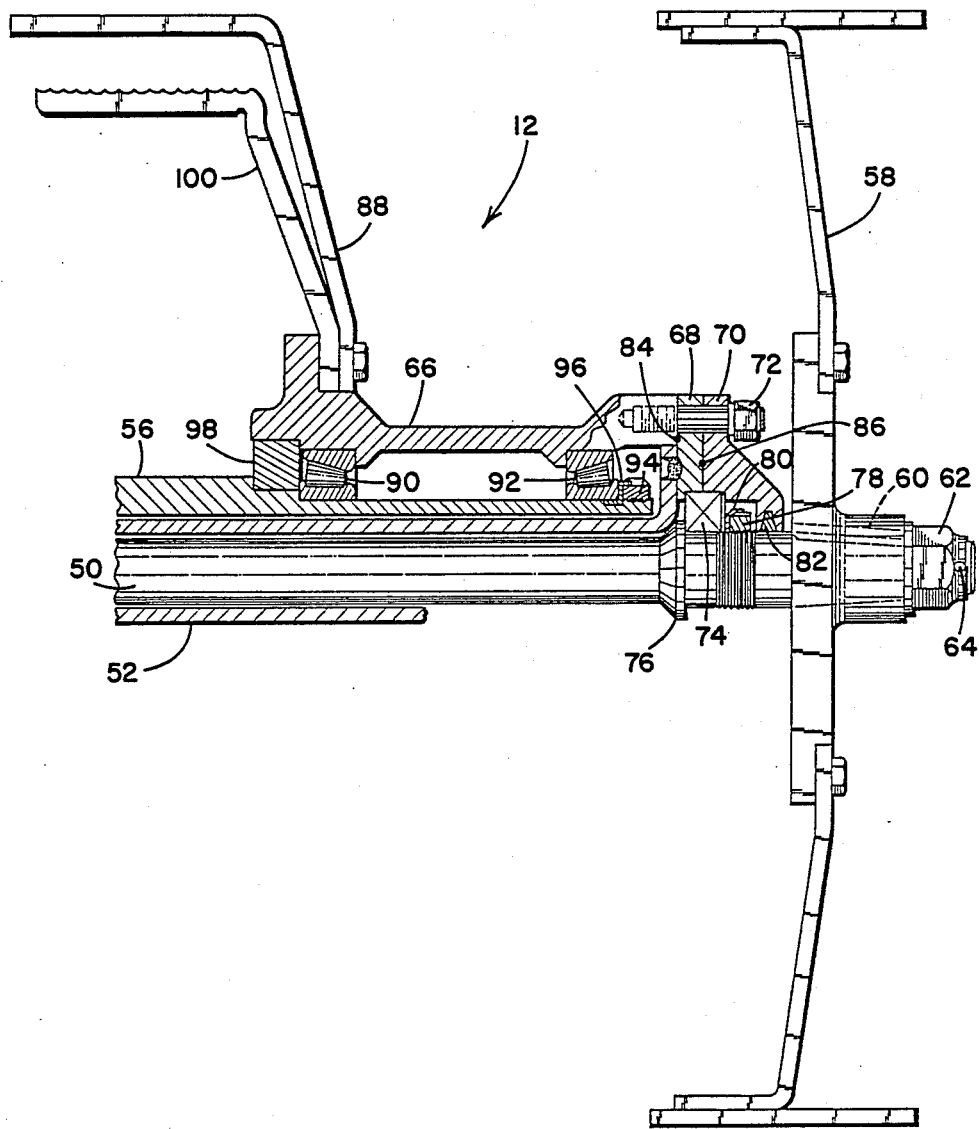
FIG. 2 is a sectional view of one end portion of the transmission with the dual wheel assembly therein.

Referring now to the Drawing, wherein like reference numerals designate like or corresponding elements throughout the views, and particularly referring to FIGS. 1 and 2, there is shown the differential 10 of the invention interconnecting opposite drive dual wheel assemblies 12, only one of which is shown. As will be explained more fully hereinafter, the differential 10 simultaneously compensates for differential drive between the dual wheel assemblies 12 as well as differential drive between the wheels in each dual wheel assembly so that all wheels are positively driven at all times.

The differential 10 includes a housing or case 12 which is shown as being of split construction having two portions interconnected by bolts 14 and associated nuts 16, only one each of which is shown. The case 12 is supported for rotation about a generally transverse axis by bearings 18, which in turn are mounted on corresponding arms 20 of a bearing carrier (not shown) which are usually part of the differential housing cover (not shown). The bearings 18 are secured in place by means of retaining rings 22 and locking clips 24 which snap into key ways in the arms 20 and rings. The carrier arms 20 are mounted within a housing (not shown) which encloses the case 12.

In the preferred embodiment, the case 12 is rotatably driven about the transverse axis by means of a circular crown or ring gear 26 and a pinion gear 28. The ring gear 26 is secured to the case 12 by bolts 30 or other suitable fasteners. The pinion gear 28 is secured to the end of an input shaft 32, which in turn is connected through a transmission to an engine or motor (not shown). If desired, the case 12 can be driven by other suitable means, such as a chain and sprocket arrangement, belt and pulley arrangement, spur gears, etc. The particular manner in which the case 12 is rotatably driven is not critical to practice of the invention.

The differential case 12 defines an internal chamber containing opposite pinion gears 34 and opposite pairs of concentric inner and outer side bevel gears 36 and 38. The pinion gears 34 are supported for rotation on an idler shaft or spindle 40 which is clamped or otherwise secured to the differential case 12 for rotation therewith. Bushings 42 are preferably provided between the pinion gears 34 and spindle 40. Belleview washers 44 functioning as thrust bearings are preferably provided between the pinion gears 34 and differential case 12.

If desired, a second transverse spindle 46 as shown, together with another pair of pinion gears similar to pinion gears 34, can be utilized.

The pinion gears 34 include dual diameter portions; i.e., two sets of teeth of different pitch, one of which is meshed with the inner bevel gear 36, and the other portion of which is meshed with the outer bevel gear 38 as shown. This comprises an important feature of the present invention, the significance of which will become apparent.

The inner bevel gear 36 is splined to the end of an inner drive shaft of axle 50. Similarly, the outer bevel gear 38 is splined to an outer drive shaft or axle 52. As shown, splined connections are utilized between the bevel gears and axles; however, key and slot arrangements or other suitable connections could also be utilized is desired. A bushing 54 is preferably provided between each bevel gear 36 and its corresponding outer bevel gear 38. Similarly, a bushing 56 is preferably provided between each outer bevel gear 38 and the differential case 12.

Referring now to FIG. 2, each pair of axles 50 and 52 extend through an axle housing 56 to their respective dual wheel assembly 12. In particular, the inner axle 50 is connected at its outer end to the outer wheel 58 by means of a tapered shaft key way 60, nut 62, and cotter pin 64. Wheel 58 comprises the outer wheel in the dual wheel assembly 12. The outer end of the inner axle 50 is journaled for rotation within a drive hub 66, clamp ring 68, and support hub 70 which are secured together by means of bolts 72, only one of which is shown. A bearing 74 is provided between a shoulder 76 on the inner shaft, and the clamp ring 68 and support hub 70. The shoulder 76 serves as an axial stop for bearing 74 on one side thereof. A threaded retainer ring 78 and key way locking clip 80 are provided on the other side of bearing 74. An oil seal 82 is located between the support hub 70 and the inner axle 50. Similarly, O-ring seals 84 and 86 are provided between confronting surfaces of hub 66, clamp ring 68, and support hub 70 for lubricant sealing purposes. It will thus be appreciated that one toothed portion of the pinion gears 34 is drivingly connected through bevel gear 36 and inner axle 50 to the outer wheel 58 of the dual wheel assembly 12.

The outer axle 52 extends in surrounding relationship about the inner axle 50 and is connected at its outer end to the drive hub 66. In particular, the outer end of the outer axle shaft 52 is flared and welded or otherwise secured directly to the clamp ring 68 as shown. The inner wheel 88 of the dual wheel assembly 12 is secured directly to hub 66, which is journaled for rotation about the axle housing 56 by means of roller bearings 90 and 92. The outer roller bearing 92 is retained in place by means of a threaded retainer ring 94 and locking clip 96, which snaps into key ways in housing 56 and the retainer ring as shown. An end seal 98 is provided adjacent to the inner roller bearing 90. The reference numeral 100 represents the brake drum for the dual wheel assembly 12. It will thus be appreciated that the outer toothed portions of pinion gears 34 are independently connected through bevel gear 38, outer axle 52 and hub 66 to the inner wheel 88 of the dual wheel assembly 12.

The differential 10 functions as follows. When the vehicle is traveling straight ahead, the bevel gears 36 and 38 do not move relative to each other, but rotate together with the differential case 12 such that the axles 50 and 52 are driven at the same speed. Similarly, when maneuvering or rounding a curve, the bevel gears 36 and 38 on one side both turn relative to those on the other side for differential drive of the dual wheel assemblies 12. However, in addition, each inner bevel gear 36 turns relative to its outer bevel gear 38 in order to effect differential drive between their respective axles 50 and 52 and wheels in each dual wheel assembly 12. The gear ratios between each toothed portion of pinion gears 34 and side bevel gears 36 and 38 are different and depend upon the spacing between the wheels 58 and 84 in each dual wheel assembly 12 and the spacing between opposite wheel assemblies. For example, if the ratio between pinion gears 34 and the inner bevel gear 36 is 1:1, then the ratio between the pinion gears and outer bevel gear 38 would be relatively less. Assume for instance, that the spacing between the outer wheels of opposite wheel assemblies is 80 inches, and that the spacing between the inner wheels thereof is 56 inches. During tight maneuvering, the inner wheel on one side may turn up to 80/56 or 1.42 revolutions for each revolution of its adjacent outer wheel, while the inverse ratio 56/80 or 0.70 would apply on the other side.

FIG. 3 shows a modification wherein a different bearing and seal arrangement is utilized. The axle 52 is integral with clamp ring 68. Axle 50 includes a flange 102. A thrust washer or bearing 104 is provided between one side of flange 102 and the end of axle 52. On the other side of the flange 102, a bushing 106 and seal 108 are provided between the inner axle 50 and hub 70. The seal 108 is secured in place by means of a retainer ring 110.

FIG. 4 shows another modification wherein the inside of clamp ring 68 is thicker and the axle 52 is secured to the clamp ring by means of a spline connection 112.

Although differential 10 as shown incorporates toothed gears in meshed engagement, non-toothed bevels and pinions in frictional engagement could be used in some applications. See my prior U.S. Pat. No. 4,635,505, the entire disclosure of which is incorporated herein by reference.

From the foregoing, it will thus be apparent that the present invention comprises a dual wheel differential having several advantages over the prior art. The differential herein not only provides for differential drive between opposite dual wheel assemblies, but also differential drive between the wheels in each assembly for improved control and less tire wear. Other advantages will be evident to those skilled in the art.

Although particular embodiments of the invention have been illustrated in the accompanying Drawing and described in the foregoing Detailed Description, it will be understood that the invention is not limited only to the embodiments disclosed, but is intended to embrace any alternatives, modifications, rearrangements and/or substitutions of elements falling within the scope of the invention as defined by the following claims.

What is claimed is:

1. In a differential of the type including a rotatable case supporting pinions engaged between opposite first bevels coupled to respective first output shafts rotatable about a common transverse axis, the improvement comprising:
    second bevels independently rotatable about the transverse axis;
    said first and second bevels both being drivingly engaged with said pinions, but at different predetermined drive ratios; and
    second output shafts coupled to said second bevels and rotatable about the transverse axis, in order to compensate for relative rotation between the first output shaft and second output shafts on each side of the differential as well as for relative rotation between the first and second output shafts on opposite sides of the differential.

2. A differential for drivingly interconnecting opposite dual wheel assemblies rotatable about a common transverse axis, which comprises:
    a rotatable case having opposite sides;
    a pair of concentric output shafts extending outwardly from each side of said case, each output shaft having inner and outer ends and being rotatable about the common transverse axis;
    said output shafts being individually coupled at their outer ends to the wheels in the respective dual wheel assembly;
    opposing pairs of bevel gears supported for rotation within said case, the bevel gears in each pair being individually coupled to the inner ends of the respective output shafts; and
    a pair of opposing pinion gears rotatably supported within said case in driving engagement at predetermined drive ratios between said opposing pairs of bevel gears;
    the drive ratios between said pinion gears and the bevel gears in each pair being different in order to compensate for relative rotation between the wheels in each wheel assembly while at the same time compensating for relative rotation between the dual wheel assemblies on opposite sides of the differential.

3. The differential of claim 2, wherein said bevel gears are individual coupled to the inner ends of the respective output shafts by spline connections.

4. The differential of claim 2, further including: means for effecting rotation of said case.

5. The differential according to claim 4, wherein said means for affecting rotation of said case comprises:
    a ring gear secured to said case;
    a drive pinion engaged with said ring gear; and
    an input shaft coupled to said drive pinion.

6. The differential of claim 2, further including:
    means for rotatably supporting each dual wheel assembly; and
    seal means between said support means and each output shaft.

7. A differential for drivingly interconnecting opposite dual wheel assemblies rotatable about a common transverse axis, which comprises:
    a rotatable case having opposite sides;
    means for effecting rotation of said case;
    a pair of inner and outer output shafts extending outwardly from each side of said case, each output shaft having inner and outer ends and being rotatable about the common transverse axis;
    said output shafts being individually coupled at their outer ends to the wheels in the respective dual wheel assembly;
    opposing pairs of inner and outer bevel gears supported for rotation within said case, the inner bevel gear in each pair being coupled to the inner ends of the respective inner output shafts and the outer bevel gear in each pair being coupled to the respective outer output shaft; and
    a pair of opposing pinion gears rotatably supported within said case in driving engagement at different predetermined drive ratios between said opposing pairs of inner and outer bevel gears in order to compensate for relative rotation between the wheels in each wheel assembly while at the same time compensating for relative rotation between the dual wheel assemblies on opposite sides of the differential.

* * * * *